Nov. 5, 1974 R. L. DIETZ 3,846,222

MULTILAYER DIELECTRIC

Original Filed June 5, 1970

United States Patent Office 3,846,222

Patented Nov. 5, 1974

3,846,222

MULTILAYER DIELECTRIC

Raymond Louis Dietz, Toledo, Ohio, assignor to Owens-Illinois, Inc., Toledo, Ohio Original application June 5, 1970, Ser. No. 43,910, now Patent No. 3,673,092. Divided and this application May 8, 1972, Ser. No. 251,501

Int. Cl. B32b 5/16

U.S. Cl. 161—162 10 Claims

ABSTRACT OF THE DISCLOSURE

Multilayer dielectrics are provided which consist of a glass binder and particles of a ceramic powder wherein the amounts of these two ingredients are correlated such that the ceramic powder substantially saturates the glass binder so as to insure the solderability of the conductors in the multilayered structure but does not substantially exceed the saturation point so as to cause a porous or non-sealed structure to be formed.

This is a division of application Ser. No. 43,910, filed June 5, 1970, now U.S. Pat. 3,673,092.

This application relates to multilayer dielectrics. More particularly, this invention relates to dielectric compositions which may be used to formulate multilayer dielectrics for use in various electronic components.

The need for multilayered dielectric components is widespread throughout the electronics industry. For example, thick filmed multilayered dielectric interconnection arrays such as thick film hybrid multilayer circuitry boards and the like find extensive use in the more complicated areas of electronics including color television, computerization and the like. Generally speaking, multilayered dielectric components are comprised of a plurality of alternating layers of a conductive material and a dielectric material, wherein, because of the dielectric properties of the intermediate dielectric material, the conductive material layers are properly insulated one from the other.

Generally, the requirements for a good thick film multilayered dielectric are fivefold;

(1) It must be capable of being fired several times without resoftening or changing physically or electrically (i.e. inert to refiring at the same temperature);

(2) It must have a low dielectric constant to minimize capacitive coupling between conductive plains (layers);

(3) The solderability (i.e. bondability of soldered leads thereto) of the conductors must be maintained; or stated another way, the dielectric material must not wet the solderable surfaces of the conductor to any substantial extent when fired;

(4) The fired structure must be a sealed structure, impervious to moisture (i.e. substantially non-porous); and (5) The fired structure must be dense without the occurrence of any substantial number of pinholes or cracks.

In the above, the term "fired" is used in accordance with its well-known meaning in the art. That is to say the term "fired" means the heating of a dielectric composition at a temperature and for a sufficient period of time to form it into a substantially solid glass-like dielectric material.

To fulfill the above requirements, the prior art has managed to develop various devitrifiable glass compositions for formulating dielectric materials. Basically, these devitrifiable glass compositions are formulated so that a conductor may be bonded thereto at temperatures which will cause the devitrifiable glass composition to devitrify (crystallize) to a certain extent; thus, lending to the devitrifiable composition dielectric properties.

Although the art has generally been able to formulate devitrifiable compositions which exhibit good solderability characteristics (i.e. they will not wet the solderable surfaces of the conductor during the simultaneous devitrification of the dielectric and firing of the conductor), many problems are attendant with these devitrifiable compositions and their formulation into dielectric products, which problems form substantial drawbacks to their use. For example, the process of devitrification itself is quite complex, necessitating a controlled time-temperature relationship to first progress the composition through a nucleation temperature and then through a crystallization temperature so as to form a crystalline ceramic phase within the amorphous glass body. In addition, the devitrification process must be carefully controlled within extremely critical limits since if insufficient devitrification (crystallization) is achieved, the desirable quality of solderability will be lost. On the other hand, if too much devitrification is achieved, (i.e. if the crystalline content is too high, then the product will tend to be porous and not impervious to misture. Closely associated with the problem of crystalline content is the problem of reproducibility and quality control in general. Because of the delicacy of devitrification, reproducibility is a difficult goal to achieve by this technique.

Another problem which arises with respect to devitrifiable compositions is that due to the nature of the devitrifying process, the glass first goes through a glassy flowable state and then through its crystalline state. Thus, when devitrifying the glass compositions to form them into their desired dielectric product or upon refiring to bond other lamina thereto to form multilayer components, resolution of lines into which the devitrifiable composition has been printed is adversely affected because of this flow characteristic during devitrification.

In view of the aforementioned problems, it can be seen that although devitrifiable compositions have fulfilled a temporary need in the art, the many problems attendant with these compositions makes it extremely desirable to formulate other compositions which overcome the economic and technological problems attendant therewith.

The art has long known of dielectric materials such as vitreous lead borosilicate glasses which do not have to be devitrified in order to achieve good dielectric properties. However, these materials have attendant serious problems which render them inoperative for use in multilayer dielectrics. Generally speaking, the problems are twofold. Firstly, these materials tend to seriously wet the conductor to which they are bonded and thus destroy the ability to solder leads onto conductors heat-sealed thereto. Secondly, because of the nature of these vitreous dielectrics, there is a tendency for the conductor heat-sealed thereto, (e.g. electrodes) to move relatively large distances within the dielectrics during firing. For these reasons, vitreous dielectric materials have generally been recognized as inapplicable, and actually in most instances inoperable, for use in multilayered dielectric devices.

From the above discussion of the prior art, it readily can be seen that a new dielectric material is needed. Ideally, such a dielectric material would combine the good features of the devitrifiable and vitreous materials known to the prior art, while circumventing the problems attendant with each. Furthermore, and further to provide an ideal dielectric, such a new material would preferably enhance rather than merely duplicate the many good qualities of these two prior art materials.

SUMMARY OF THE INVENTION

This invention fulfills the above-described need in the art. Generally speaking, this is accomplished by the use of a unique dielectric composition which combines the solderability properties of the devitrifiable dielectric materials with the economic advantages of not having to carefully control time-temperature firing relationships to achieve a given amount of crystallinity in the product. Furthermore, because no devitrification is required, the problem of flow is avoided. In addition, the dielectric compositions of this invention are capable of being fired several times without resoftening or changing physically or electrically. In addition, they exhibit low dielectric constants and, in many instances, exhibit substantially lower dielectric constants than are realized in the prior art, thus minimizing capacitive coupling between various conductor layers or plains. Furthermore, the structures formed by heat-firing from these compositions are in many instances fully sealed structures impervious to moisture (i.e. substantially non-porous) and are extremely dense to the extent that substantially no pinholes or cracks occur. In addition, not only does the high density of the dielectric formed from the unique compositions of this invention result in the absence of pinholes or cracks, but it also adds extremely high dielectric strength as well. Thus, in many instances, this invention does not merely duplicate the best features of the prior art materials discussed above, but actually enhances the features to the benefit of the art.

Basically, the dielectric compositions of this invention comprise a glass binder and a ceramic powder, the amount of the glass binder and ceramic powder being such that a resulting dielectric product formed by firing the composition will not wet the solderable surfaces of a conductor when said conductor is heat-sealed thereto at about at least the firing temperature of the dielectric. Stated more specifically, the amount of glass binder and ceramic powder are correlated in such a way that the ceramic powder substantially saturates the glass binder so that insufficient glass binder remains to wet the surfaces of a connected conductor to which leads are to be soldered, thus preserving the solderability characteristics of the conductor while at the same time allowing the dielectric and conductor to be fired at the same temperature and therefore preferably simultaneously. In addition, and preferably, the ceramic powder is not in an amount sufficient to cause any substantial porosity when the structure is fired into its final product, thus ensuring the formation of a sealed structure.

With respect to the desirable avoidance of pinholes and cracks as well as high dielectric strength through the achievement of high density in the ultimate product, the particle size of the ceramic powder is also correlated with the amounts of the glass binder and ceramic powder to provide just such a structure.

In certain exceptional circumstances the amount of glass binder and ceramic powder as well as the particle size of the ceramic powder may vary over a wide range. Generally speaking, however, the dielectric compositions contemplated by this invention are comprised of about 60–40% by weight glass binder and about 40–60% by weight ceramic powder. In addition, the average particle size of the ceramic powder generally contemplated is at least about 0.2 microns and the average particle size of the glass should be about 1.0–9.0 microns.

The glass binder which is preferably used as a lead borosillicate glass and most preferably a lead barium borosillicate glass. The preferred ceramic powder for use in this invention is zircon (i.e. $ZrSiO_4$). Preferred particle sizes are those exceeding about 1 micron and most preferably are between about 1–10 microns.

The dielectric constants which are achieved by the practice of this invention may range from as low as 4 upward to about 15 or greater depending upon the type of ceramic used, the formulation of the glass binder and the like. Generally speaking, it is art recognized that for the purposes of multilayered dielectrics, the dielectric coefficient should not exceed about 15 and most preferably should be as low as possible. In a particularly preferred embodiment of this invention, there is provided a dielectric composition which is solderable, reproducible, refirable without change simultaneously with conventional conductors, has extremely low dielectric constants of about 4–7, is substantially non-porous and impervious to moisture, is extremely dense and has substantially no pinholes or cracks after firing and is extremely economical to formulate because no devitrification is necessary. Such an embodiment consists essentially of about 50–55% by weight zircon and about 45–50% by weight of a glass binder consisting essentially of 30–40% by weight SiO, 8–12% by weight $B_2O_3$, 10–15% by weight $Al_2O_3$, 11–16% by weight PbO, 20–25% by weight BaO and 0–3.0% by weight $TiO_2$. The particle size of the zircon is preferably about 4.0 microns.

The above compositions are formulated into their dielectric multilayer components simultaneously with the heat-sealing of the conductors thereto by simple non-critical firing without the need for devitrification and thus are extremely economical and reproducible as compared with the devitrifiable compositions heretofore used in the prior art.

This invention will be more clearly understood by reference to the drawings, their description and a detailed description of the invention which hereinafter follows:

IN THE DRAWINGS

DETAILED DESCRIPTION OF THE INVENTION

One of the primary properties that a conductor within a multilayer circuit board must exhibit is the property of good solderability. The term "solderability" is well-understood in the art and is used herein in accordance with its well-known meaning. That is to say, solderability is used to indicate that property of a conductor which, after having a resin flux applied thereto and after having been dipped into molten solder for a period of a approximately ten seconds, is capable of retaining, in a strongly bonded form, the solder for purposes of use.

Figure 1:
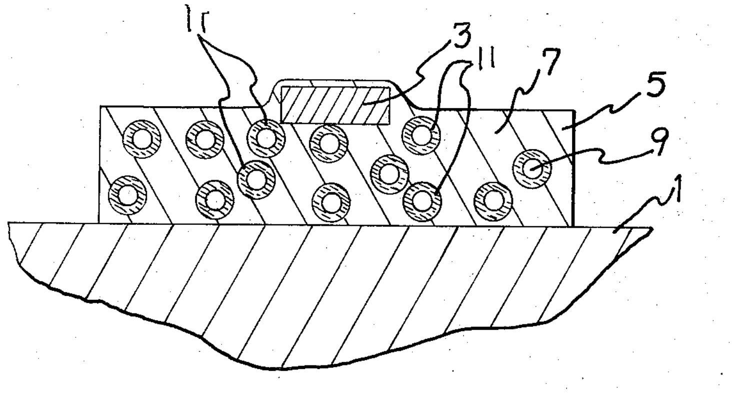
FIG. 1 is a side sectional view of a tri-lamina multilayered circuit board wherein wetting of the uppermost conductor has occurred.

FIG. 1 illustrates how the property of solderability is negated by a dielectric composition which wets the solderable surfaces of a conductor during the firing or refiring of the laminated structure. Referring to this figure, there is provided a base lamina 1 which may be a base conductor material fired prior to the formation of further lamina thereon.

In order to provide a dielectric between conductor 1 and further conductor 3, there is provided a dielectric composition 5. For purposes of illustration, dielectric composition 5 is formed of a glass binder 7 having dispersed therein particles of a ceramic powder 9 such as zircon. In this illustrated embodiment, the ceramic particles 9 are in an amount insufficient to saturate the glass binder 7. Instead, the particles are provided in an amount sufficient only to provide a saturation of the glass binder, as shown at 11, in an area of the glass binder immediately surrounding particle 9. Since there is excess glass binder present, firing of (i.e. heating) the structure to bond conductor 3 and 1 to dielectric composition 5, and simultaneously form a dielectric material of composition 5, will result in some of the excess glass binder 7 diffusing through conductor 3 or otherwise flowing and forming a wetted coating of binder 7 about the uppermost solderable surface of conductor 3, thus destroying its solderability characteristics. As stated hereinabove, it is the purpose of this invention to prevent this situation from occurring.

Figure 2:
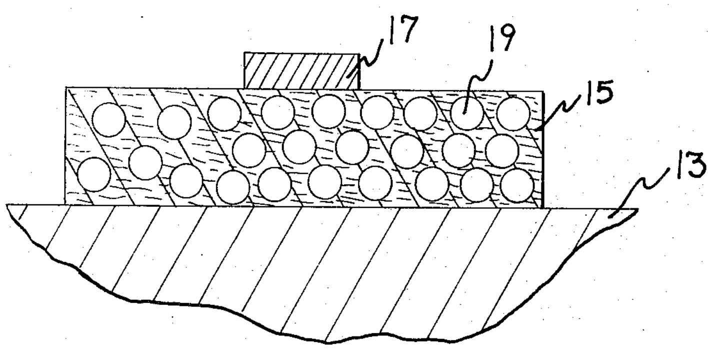
FIG. 2 is a side sectional view of a non-wetted, solderable tri-lamina multilayered circuit board in accordance with this invention.

Referring to FIG. 2, there is illustrated a tri-lamina structure in accordance with this invention. Lamina 13 is similar to lamina 1 in FIG. 1. Glass binder 15 of the dielectric layer is provided with a sufficient amount of ceramic powder particles 19 so that upon firing of the dielectric material to change it from a fused composition to a dielectric lamina, a certain amount of the ceramic particles 19 are solubilized into the glass binder 15 so as to fully saturate glass binder 15. By fully saturating glass binder 15, no excess vitreous glass is available to wet the solderable surfaces of conductor 17 during the firing operation. Furthermore, although intact ceramic particles remain in the glass binder, the amount of such particles 19 used is insufficient to prevent the achievement, after cooling of the fired structure, of a non-porous, sealed structure. That is to say, and as illustrated in FIG. 2, after cooling, binder 15 still forms a surrounding vitreous smooth glassy moisture impermeable wall about the structure.

As stated hereinabove, and as shown by comparison with respect to aforementioned FIGS. 1–2, the key to the achievement of the primary property of solderability is the correlation of the amount of glass binder to the amount of ceramic powder used, such that the ceramic powder will saturate the glass binder to the extent that an insufficient amount of glass binder remains for wetting the solderable surfaces of the conductor.

Although the glass binders contemplated for use in this invention may be of any well-known type including borosilicate glass generally and lead borosilicate glasses more preferably, as stated above, the preferred glass composition for the purposes of this invention includes a lead barium borosilicate glass having the following weight percent range: about 30–40% $SiO_2$; 8–12% $B_2O_3$; 10–15% $Al_2O_3$; 11–16% PbO; 20–25% BaO; and 0–3.0% $TiO_2$. An example of a particularly preferred glass composition within this range of lead barium borosilicate glasses is a glass consisting of 37% $SiO_2$, 10% $B_2O_3$, 13% $Al_2O_3$, 15% PbO, 23% BaO and 2% $TiO_2$.

Any well-known ceramic material which exhibits good dielectric properties may be used as a ceramic powder in accordance with this invention. Examples of such ceramic powders include $ZrO_2$, $Al_2O_3$, $TiO_2$, the zirconium silicates such as $BaZrSiO_4$, $MgZrSiO_4$, $ZnZrSiO_4$, devitrified glass particles and the like. For the purposes of this invention, and because of the extremely good solderability, sealability, density and low dielectric coefficients achieved when using the material, it is preferred to use zircon (i.e. $ZrSiO_4$) as the ceramic powder.

For purposes of the invention, the range of ingredients as to the glass binder and ceramic powder will vary depending upon the particular glass binder and ceramic used. The primary factor in ascertaining the exact amount of each to use is the characteristic of solderability which must be achieved even though conductor firing temperatures are at least equal to the firing temperature of the dielectric composition employed. For the purposes of this invention and generally speaking, from about 60–40% by weight of glass binder to about 40–60% by weight of ceramic powder will generally ensure that solderability as described will be present to a sufficient degree for operability in the final dielectric formed even though firing of the dielectric and conductor are simultaneously effected. An especially preferred range of ceramic powder, especially when zircon is used as the ceramic material and the preferred lead barium borosilicate glasses, as described, are employed, consists of 50–55% by weight zircon and 45–50% by weight glass binder.

While the achievement of solderability, even though conductor firing is effected at temperatures at least about the firing temperature of the dielectric, is of primary importance for the purposes of this invention, there are many other properties which also be attained in the preferred products of this invention. These properties, alluded to hereinbefore, include a relatively high density of the ultimate prdouct to an extent that good dielectric strength and substantially no pinholes or cracks are achieved. In addition, the products formed must be preferably capable of being fired several times without resoftening or changing physically or electrically. In addition, they must preferably form non-porous sealer structure and exhibit low dielectric constants.

Generally speaking, all of the above properties desirable in dielectric material are achieved not only by attention to the correlation between the amount of the ceramic powder and the glass binder but also to the correlation therewith of the average particle size of the ceramic powder used. In this respect, it has been found that if the particle size of the ceramic powder is too small, the resultant dielectric, when cooled, will exhibit a large number of pinholes and cracks. Such a dielectric will also lack density and thus the desired dielectric strength. While particle sizes may vary in a given system, it has generally been found for most systems that the particle size of the ceramic powder, generally should not be less than about 1–4 microns in order to optimize both dielectric strength and prevent pinholes and cracks from forming.

The upper limit of the particle size of the ceramic powder is generally based upon practical considerations such as the ability to screen print, and the like, since such practical considerations come into being far in advance of the point at which inoperability will occur within the dielectric material itself. A preferred range of average particle size especially when zircon is used as the ceramic powder is from about 3–4 microns. A particularly preferred average particle size, which appears to give optimum properties when correlated directly in accordance with the above teachings with respect to the amount of glass binder and the amount of ceramic powder used, is about 4.0 microns.

The dielectric compositions of this invention are generally applied in paste form by a conventional screen printing technique, especially when they are to be used as a dielectric intermediate material in a thick film hybrid multi-layered circuit board. Such pastes are generally formulated by first dry blending the ceramic powder and a glass binder into a relatively homogeneous admixture. Thereafter, an organic paste vehicle, preferably consisting of 2½ by weight ethyl cellulose admixed with a thinner formed of two parts by weight butyl carbitol acetate and one part isoamyl salicylate is formulated and admixed by slowly pouring the dried blend therein with agitation.

Figure 3:
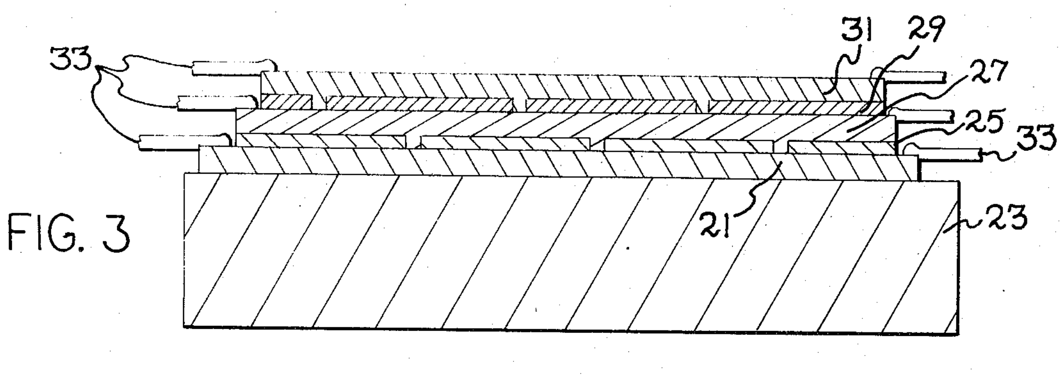
FIG. 3 is a side sectional view of thick film hybrid multilayer circuit board having a plurality of soldered leads in accordance with this invention.

Referring to FIG. 3, there is illustrated a typical thick film hybrid multilayer dielectric as contemplated by this invention. Such a dielectric is formulated by first screen printing a conductor such as a conventional Pd-Au or Pd-Ag thick film conductor paste 21 onto a conventional ceramic substrate 23. The thick film conductor paste is then fired at a temperature of about 800–1,000° C. for about 5–15 minutes at peak with an 5–10 minute heat-up and cool-time. The heat-up and cool-off time are not critical.

After conductor 21, is fired as described, and is allowed to cool, the dielectric paste of this invention is screen-printed, usually in two coats, and preferably using a mesh screen of 165 or 200, over conductor layer 21 so as to form dielectric layer 25. The dielectric paste is then air dried for 2 to 5 minutes and later oven dried at a temperature of about 100° C. to 125° C. for about 15 to 20 minutes. Air drying is merely optional, usually employed to improve leveling of the printed structure.

Next, another thick film conductor paste is screen-printed in accordance with well-known techniques in a predetermined pattern over dielectric layer 25 so as to form additional conductive layer 27. Conductive layer 27 and dielectric layer 25 are then co-fired simultaneously at the firng temperature of both the dielectric and conductor, which in the case of Pd-Au conductor pastes, for example, is about 875° C. for about 5 minutes at peak with 8 minute heat-up and cool-off period. Such a firing affects not only the formation of the dielectric as well as the conductor but serves to adhere the conductor to the dielectric by heat-sealing thereto without any substantial wetting of the solderable surfaces of the conductor occurring.

One of the distinct advantages of this invention is the simplicity by which dielectric layer 25 is formed and adhered to conductors 23 and 27 while still maintaining the solderability of layers 21 and 27. This is due to the fact that the dielectric materials in accordance with this invention are saturated with ceramic powder and may be fired or refired over a wide range of temperature usually from about 800 to 1,000° C. without such a firing affecting the chemical or physical properties of the later cooled product. Such saturation and flexibility in firing temperatures allows the conductor and dielectric to be simultaneously fired or separately fired at temperatures at least as high as the firing temperature of the dielectric and thus avoids the necessity of the heat sealing and firing of the top conductor in a separate step at a temperature lower than the firing temperature of the dielectric in order to maintain solderability. The use of the dielectrics of this invention, therefore, not only economically simplifies the firing process especially over known dielectrics such as devitrifiable materials, but also extends the technique to conductors having higher firing temperatures while still maintaining the desired primary property of solderability.

Additional laminae 29 and 31 may be added as desired by using the same general procedures as hereinbefore described with respect to the formation of laminae 25 and 27. It is understood of course that the various conductor layers may be fired separately from the dielectric layers since the dielectrics of this invention are refirable as described above. It is preferred, of course, for economic reasons to fire both layers simultaneously.

In FIG. 3, the solderability properties are exemplified by the representation of soldered leads 33 which have been soldered in accordance with well-known techniques onto the conductive laminae of the hybrid board. It has been found that when using dielectrics in accordance with this invention, little or no wetting of the conductive layer surfaces to which the solder is to be attached occurs and thus an extremely tenacious bond is formed by leads 33 with their respective conductive layers.

EXAMPLES 1–16

The following dielectrics were formulated in accordance with the above teachings to illustrate rather than limit this invention. In each example, a paste was first formed by initially dry blending the indicated amount of zircon with a glass binder so as to equal 100%. That is, for example, in Example 1, there was admixed 25% by weight zircon and 75% by weight glass binder. The glass binder used consisted of ground lead barium borosilicate glass of the formula by weight: 37% $SiO_2$; 10% $B_2O_3$; 13% $Al_2O_3$; 15% PbO; 23% BaO and 2% $TiO_2$. The glass was ground to an average particle size of about 1 micron before dry blending.

An organic vehicle was formulated using 2½% by weight of ethyl cellulose and the remainder (97.5% by weight) of a thinner which consisted of two parts by weight butyl carbitol acetate and 1 part by weight isoamyl salicylate. To 24 grams of this organic vehicle were added, slowly and with stirring 76 grams of the indicated dry blend until a paste was formed.

The dielectric paste composition was then screen-printed using a 165 mesh screen onto a ceramic substrate and then briefly air-dried and then oven-dried at a temperature of 125° C. for 15 minutes using one or two coats to achieve a thickness of about 2 mils. Next, a conventional Pd-Au thick film conductor paste was screen printed using a mesh size of 200 onto the dried dielectric layer and both pastes were fired simultaneously at about 875° C. for about 5 minutes at peak with 8 minutes heat-up and cool-off periods. The solderability, porosity as represented by sealed structure, and density as indicated by pinholes and cracks were then ascertained by observation. The Pd-Au past is formulated by admixing particles of a Pd-Au conductor powder having an average particle size of 2–3 microns and consisting of 70.4% by weight Au, 17.6% by weight Pd, 8.0% by weight $Bi_2O_3$, and 4.0% by weight $SiO_2$; 16.0% by weight $B_2O_3$; 0.4% by weight $Al_2O_3$; 60.0% by weight PbO; and 5.9% by weight CdO with a liquid organic vehicle consisting of 20% by weight ethyl cellulose and 80% by weight butyl carbitol acetate and 1 part by weight iso-amyl salicylate. The paste is formulated of 75% by weight Pd-Au powder and 25% by weight liquid organic vehicle. The results of this experimentation are listed in the following table:

TABLE A

| Ex. | Average zircon particle size, microns | Percent zircon | Description of dielectric |
|---|---|---|---|
| 1 | 1.0 | 25 | Sealed structure, nonsolderable. |
| 1 | | 35 | Do. |
| 3 | | *42.5 | Solderable, sealed structure, pinholes and cracks. |
| 4 | | 45 | Solderable, porous, pinholes and cracks. |
| 5 | | 50 | Solderable, more porous, less pinholes and cracks. |
| 6 | 2.0 | 50 | Solderable, porous, few pinholes and cracks. |
| 7 | 2.75 | 25 | Nonsolderable, sealed structure, no pinholes and cracks. |
| 8 | | *45 | Solderable, sealed structure, few pinholes and cracks. |
| 9 | | 50 | Solderable, porous, few pinholes and cracks. |
| 10 | | 55 | Do. |
| 11 | | 60 | Do. |
| 12 | 4.0 | 48 | Nonsolderable, sealed, no pinholes or cracks. |
| 13 | | 50 | Solderable, sealed, no pinhols or cracks. |
| 14 | | *52 | Do. |
| 15 | | 54 | Do. |
| 16 | | 56 | Solderable, porous, no pinholes or cracks. |

*Indicates approximate percent at which zircon saturates the glass binder. As illustrated, the exact saturation point does not have to be achieved, but merely substantial saturation (i.e. approaching the saturation point) for solderability to be present.

The above table illustrates the correlation between not only the amount of ceramic powder and glass binder used, but also the particle size of the ceramic powder as well. It is important to observe the particularly preferred compositions 13, 14 and 15 wherein the zircon particle size is about 4 microns. Not only do these compositions exhibit excellent solderability, sealed structure (non-porosity) and contain substantially no pinholes or cracks, but they also exhibit a dielectric constant of about 4–7 and usually about 6 which is significantly below the normally low dielectric constant of 11 or greater exhibited by even the best devitrifiable glass compositions known for use in this environment. In addition, because of the extremely high density of these preferred compositions, they exhibit exceptional dielectric strength of greater than 1000 volts/mil as well.

Once given the above disclosure, many other features, modifications and improvements will become apparent to those skilled in the art. Such features, modifications and improvements are therefore considered to be a part of this invention, the scope of which is to be determined by the following claims.

I claim:

1. A dielectric lamina formed from a dielectric composition, said composition comprising:

(a) about 60–40% by weight of alead barium borosilicate glass binder having an average particle size of about 1.0–9.0 microns which is useful as a dielectric binder material in microelectronic devices and which is capable of being substantially saturated by a ceramic powder; and (b) about 60–40% by weight of a ceramic powder selected from the group consisting of $ZrO_2$, $Al_2O_3$, $TiO_2$, the zirconium silicates, and devitrified glass particles, and having an average particle size of about 1–10 microns; the amount and particle size of said glass binder and ceramic powder being correlated such that the ceramic powder substantially saturates the glass binder in that insufficient glass binder remains in unsaturated form to wet the surfaces of a solderable conductor when said conductor is heat-sealed thereto at about at least the temperature at which the dielectric composition is fired and the dielectric lamina formed from said composition is substantially free from pinholes and cracks, said dielectric lamina exhibiting a dielectric constant of about 4–7 at a 2 mil thickness, and a dielectric strength of greater than about 1000 volts/mil, when said lamina is formed by firing it at a temperature of 800–1000° C. for about 5–15 minutes.

2. A hybrid multilayer dielectric circuit board comprising a plurality of alternate conductive lamina and dielectric lamina, said dielectric lamina being formed from a lamina according to claim 1.

3. A dielectric lamina formed from a dielectric composition comprising:

(a) about 60–40% by weight of a glass binder having an average particle size of about 1.0–9.0 microns, said glass binder consisting essentially of by weight percent about: 30–40% $SiO_2$; 8–12% $B_2O_3$; 10–15% $Al_2O_3$; 11–16% PbO; 20–25% BaO; and 0–3% $TiO_2$; and (b) about 60–40% by weight of a ceramic powder selected from the group consisting of $ZrO_2$, $Al_2O_3$, $TiO_2$, the zirconium silicates, and devitrified glass particles, and having an average particle size of about 1–10 microns;

the amount and particle size of said glass binder and ceramic powder being correlated such that the ceramic powder substantially saturates the glass binder in that insufficient glass binder remains in unsaturated form to wet the surfaces of a solderable conductor when said conductor is heat-sealed thereto at about at least the temperature at which the dielectric composition is fired and the resulting dielectric lamina formed from said composition is substantially free from pinholes and cracks.

4. A dielectric lamina according to claim 3 wherein said ceramic powder is zircon, the amount of said zircon is 50–55% by weight of said composition, and the amount of said glass binder is 45–50% by weight of said composition.

5. A dielectric lamina according to claim 4 wherein the average particle size of said zircon is about 3–4 microns.

6. A dielectric lamina according to claim 5 wherein said glass binder consists of by weight about: 37% $SiO_2$, 10% $B_2O_3$, 13% $Al_2O_3$, 15% PbO, 23% BaO, and 2% $TiO_2$.

7. A dielectric lamina according to claim 5 wherein said resulting dielectric exhibits a dielectric constant of about 4–7 at 2 mils thickness, is of extremely high density and exhibits a dielectric strength of greater than about 1000 volts/mil, when fired at a temperature of 800–1000° C. for about 5–15 minutes.

8. A hybrid multilayer dielectric circuit board comprising a plurality of alternate conductive lamina and dielectric lamina, said dielectric lamina being formed from a lamina according to claim 6.

9. A hybrid multilayer dielectric circuit board comprising a plurality of alternate conductive lamina and dielectric lamina, said dielectric lamina being formed from a lamina according to claim 7.

10. A dielectric lamina according to claim 6 and having a dielectric constant of about 6.

References Cited

UNITED STATES PATENTS

| | | | |
|---|---|---|---|
| 2,956,219 | 10/1960 | Cianchi | 317—258 |
| 3,020,456 | 2/1962 | Layton et al. | 161—196 |
| 3,540,894 | 11/1970 | McIntosh | 106—73.4 |
| 3,495,996 | 2/1970 | Delaney et al. | 106—73.3 |
| 3,232,856 | 2/1966 | Klach et al. | 106—34 R |
| 3,293,077 | 12/1966 | Kaiser et al. | 106—46 X |
| 3,223,905 | 12/1965 | Fabricius | 317—258 |
| 3,189,978 | 6/1965 | Stetson | 106—46 X |
| 3,503,763 | 3/1970 | Mills | 106—53 |

WILLIAM J. VAN BALEN, Primary Examiner

U.S. Cl. X.R.

161—196, Dig. 7

UNITED STATES PATENT AND TRADEMARK OFFICE

CERTIFICATE OF CORRECTION

PATENT NO. : 3,846,222

DATED : November 5, 1974

INVENTOR(S) : R. L. Dietz

It is certified that error appears in the above-identified patent and that said Letters Patent are hereby corrected as shown below:

Col. 2, line 19, "misture" should be --moisture--; Col. 3, line 16, "dielectric" should be --dielectrics--; Col. 4, line 8, "SiO" should be--$SiO_2$--; Col. 4, line 44, Delete "a" (second occurrence); Col. 5, line 71, after "which" insert --must--; Col. 5, line 74, "prdouct" should be product--; Col. 6, line 4, "sealer" should be --sealed--; Col. 6, line 7, after "in" insert --a--; Col. 6, line 41, after "2 1/2" insert --%--; Col. 6, line 43, after "part" insert --by weight--; Col. 6, line 52, "5-10" should be --8-10--; Col. 6, line 53, "cool-time" should be --cool-off time--; Col. 6, line 72, after "with" insert --an--; Col. 7, line 75, "past" should be --paste--; Col. 8, Table A, "Example 1"(second occurrence) should be --Example 2--; Col. 8, line 63, "alead" should be --a lead--.

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*